United States Patent [19]

Finger

[11] 3,838,556

[45] Oct. 1, 1974

[54] AIR FILTRATION DEVICE WITH ORIENTED OUTPUT

[75] Inventor: Armin A. Finger, North Wilbraham, Mass.

[73] Assignee: Med-Assists, Inc., Newton, Mass.

[22] Filed: Apr. 6, 1973

[21] Appl. No.: 348,471

[52] U.S. Cl............ 55/385, 55/414, 55/472, 55/473, 55/DIG. 18, 98/36, 98/115 LH, 55/DIG. 29
[51] Int. Cl............ B01d 46/40, F24f 9/00
[58] Field of Search............ 55/385, 413, 414, 383, 55/416, 394, 397, 467, 4 B, 472, 473, 476, 55/279, 497, 500, DIG. 18, DIG. 29, 55/DIG. 36; 98/5, 36, 89, 115 LH, 40 R; 128/376–378; 21/83, DIG. 1, 14 R; 5/1; 62/261; 239/553.3

[56] References Cited
UNITED STATES PATENTS

| | | | |
|---|---|---|---|
| 3,031,826 | 5/1962 | Brimberg et al. | 98/40 R |
| 3,426,512 | 2/1969 | Nesher | 55/467 |
| 3,724,172 | 4/1973 | Wood | 55/97 |

FOREIGN PATENTS OR APPLICATIONS 1,448,873   6/1965   France

Primary Examiner—Frank W. Lutter
Assistant Examiner—David L. Lacey
Attorney, Agent, or Firm—Alfred H. Rosen; Frank A. Steinhilper

[57] ABSTRACT

An air filtration device is disclosed, in a cabinet having an air outlet port that is located in a normally vertically oriented front wall, with a foraminous plate covering the outlet port. This plate is generally flat and approximately vertically oriented in its lower portion and is curved about a generally horizontal axis in its upper portion to provide a horizontally oriented bulge away from the front wall in the upper portion. The plate has a plurality of passages through it which are oriented to direct exhaust air from passage in a direction that is generally normal to the plate. The bulge serves to expand the air flow as it moves away from the upper portion of the plate. The lower flat portion of the plate is tilted downwardly so that air exhausted through the lower portion tends to sweep in a gently-angled downward direction. The expanding flow from the bulge tends to sweep upward and away from a person using the device any dust particles that may enter the exhaust air stream from the top of the cabinet.

7 Claims, 8 Drawing Figures

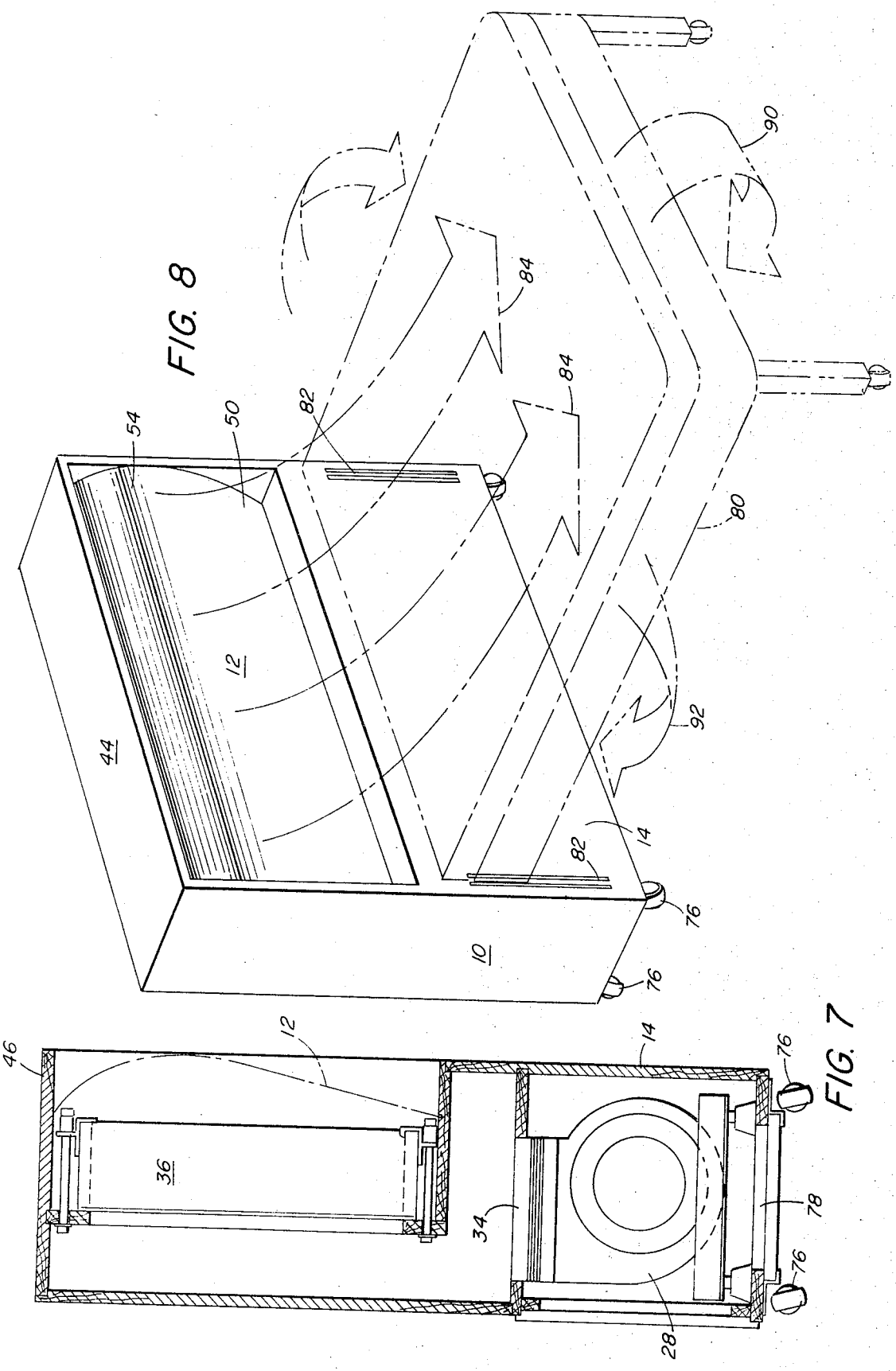

AIR FILTRATION DEVICE WITH ORIENTED OUTPUT

BACKGROUND OF THE INVENTION

Persons suffering from allergies, asthmatic persons and others who are made ill or uncomfortable upon breathing air that is laden with dust or other particulate matter have use for air filtration devices, and indeed many such devices exist. While attention has been given in these devices to various techniques for moving and filtering air, to my knowledge none has dealt in a sophisticated way with the output of filtered air. Typically, louvers are used to direct exhaust air, and to widen the distribution pattern and avoid uncomfortable drafts it is usual to employ movable louvers resembling shutters, sometimes in patch-work arrays intended to scatter the air in various directions. These are not ideal solutions to the problem, and their structures tend themselves to gather dust, which enters the filtered air stream, tending to defeat the purpose of the filtration devices. In free-standing and table-top filtration units, dust may settle on the top surface of the cabinet, and this dust can be sucked into the exhaust stream of filtered air.

BRIEF DESCRIPTION OF THE INVENTION

This invention provides a simple treatment of filtered exhaust air which has as its purpose to improve air filtration devices by minimizing defects such as those mentioned above. Generally according to the invention the device is in a cabinet having an air outlet port that is located in a normally vertically oriented front wall, with a foraminous plate covering the outlet port. This plate is generally flat and approximately vertically oriented in its lower portion and is curved about a generally horizontal axis in its upper portion to provide a horizontally oriented bulge away from the front wall in the upper portion. A hood or the equivalent has side walls embracing the side edges of the plate and the ends of the bulge, and a top wall overlying the bulge. The plate has a plurality of passages through it which are oriented to direct exhaust air from each passage in a direction that is generally normal to the plate. The bulge serves to expand the air flow as it moves away from the upper portion of the plate. The lower flat portion of the plate is tilted downwardly so that air exhausted through the lower portion tends to sweep in a gently-angled downward direction. The expanding flow from the bulge tends to sweep upward and away from a person using the device any dust particles that may enter the exhaust air stream from the top of the cabinet. This action is enhanced by the fact that the portion of the plate at the top side of the bulge makes an acute angle with the top wall, so that air exhausted through the passages in that portion is squeezed and the air velocity increases at the top wall overhang. Air filtration devices incorporating the invention are especially suited for use in combination with a bed, where the downwardly-sweeping filtered air stream from the tilted lower portion of the plate can be directed to sweep over the top surface of the bed, while the expanding exhaust stream from the bulge prevents dust from entering the filtered air stream that is sweeping over the bed.

BRIEF DESCRIPTION OF THE DRAWINGS

FIG. 7 is a side-sectional view of an air filtration device for use as a headboard of a bed; and FIG. 8 shows the device of FIG. 7 in combination with a bed.

DETAILED DESCRIPTION OF THE DRAWINGS

Figure 1:
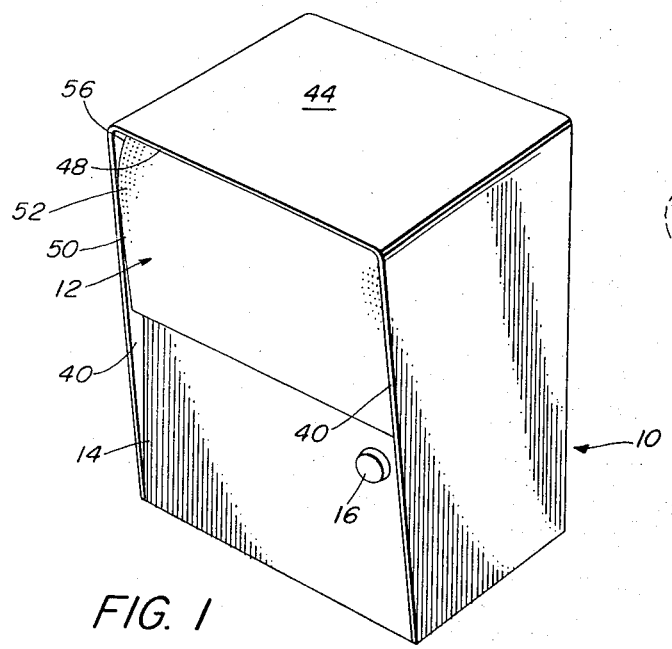
FIG. 1 is an isometric view of an air filtration device.

FIG. 1 comprises a cabinet 10 suitable for use on a table or a desk. Its size is such that it can be placed on a low table or a chair adjacent a bed so that it can be used by a person asleep in the bed. A curved foraminous plate 12 is fitted to the upper portion of the front wall 14 of the cabinet, for distribution of filtered air. A control knob 16 is located in the front wall below the plate 12, to control the output of filtered air.

Figure 2:
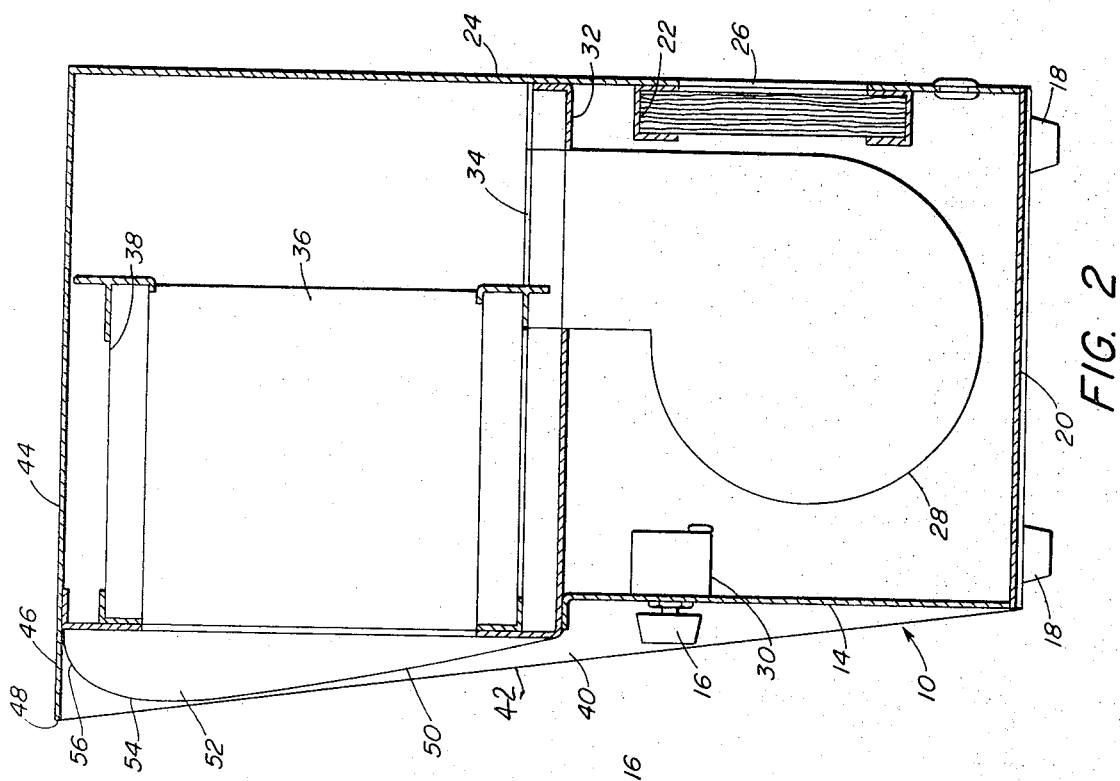
FIG. 2 is an enlarged side-sectional view of FIG. 1.
Figure 3:
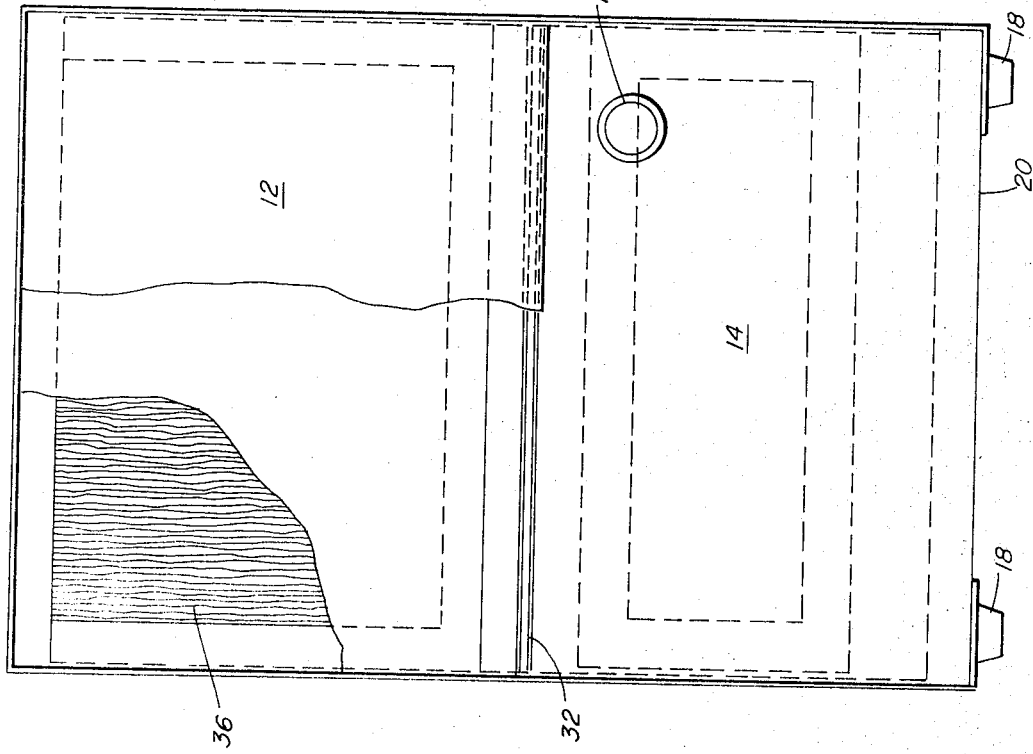
FIG. 3 is a front view of FIG. 2, partly broken away.

As shown in FIGS. 2 and 3, the cabinet 10 has short feet 18 fitted to its bottom wall 20, and an air intake port 22 in the lower portion of its rear wall 24. A coarse filter 26 may be fitted in the intake port. An air moving blower 28 is fitted in the lower portion of the cabinet. The control knob 16 is used to regulate a combined on-off switch and speed control unit 30 for the blower. A horizontal partition 32 in the cabinet supports the blower depending from it, the outlet of the blower being in register with an opening 34 through the partition. A vertically oriented high-efficiency particle filter (HEPA) 36 is fitted in the upper portion of the cabinet 10, in an air outlet port 38 in the front wall 14. Extensions 40 of the side walls of the cabinet 10 have front edges 42 which slant forward from the bottom to the top of the cabinet, and the top wall 44 has a forward part 46 that extends over the outlet port 38 and the foraminous plate 12 to register at its forward edge 48 with the side wall extensions 40, forming with the side wall extensions a hood embracing the side and top edges of the plate. The plate 12 is generally flat in its lower portion 50 and is curved around a generally horizontal axis in its upper portion 52 to form a bulge 54 extending forward of the outlet port 38 under the forward edge 48 of the top wall 44. The upper portion 56 of the bulge adjacent the top edge of the plate 12 makes an acute angle with the forward part 46 of the top wall. The lower flat portion 50 of the plate 12 is slanted forward away from the outlet port 38, from its lower horizontal edge to the bulge 54.

Figure 6:
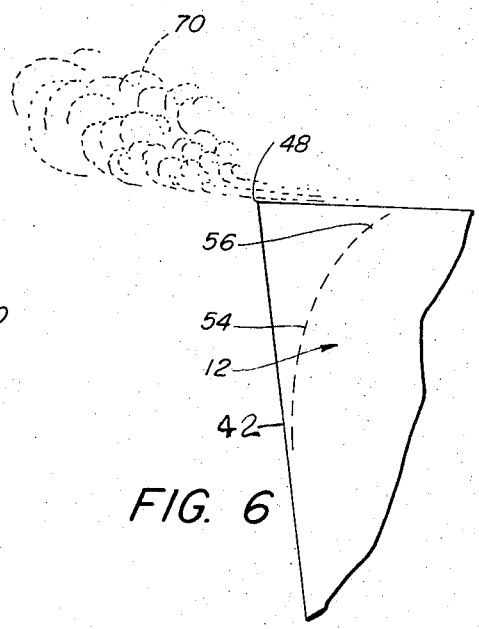
FIG. 6 is a fragmentary view of the FIG. 5 portion showing a feature of the operation of FIG. 1.
Figure 4:
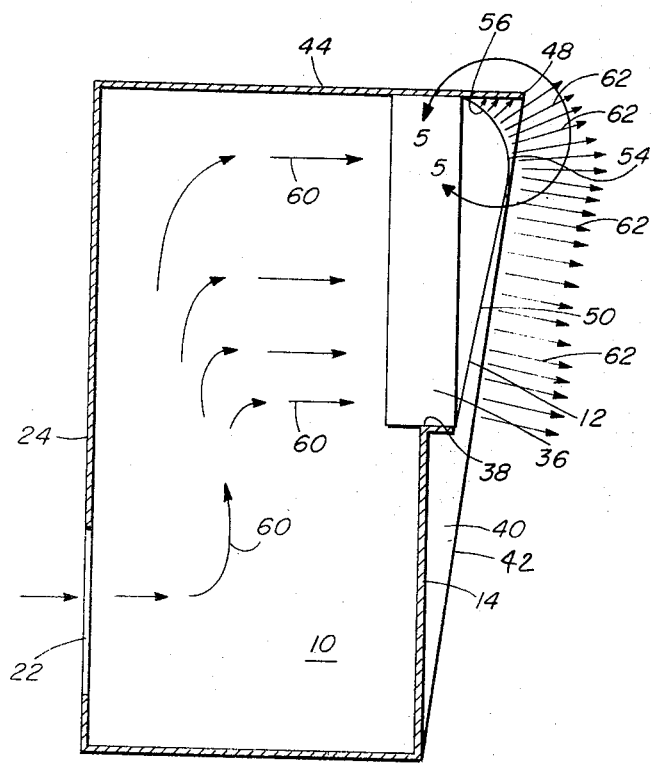
FIG. 4 is a side schematic view of FIG. 1 showing an air flow pattern.
Figure 5:
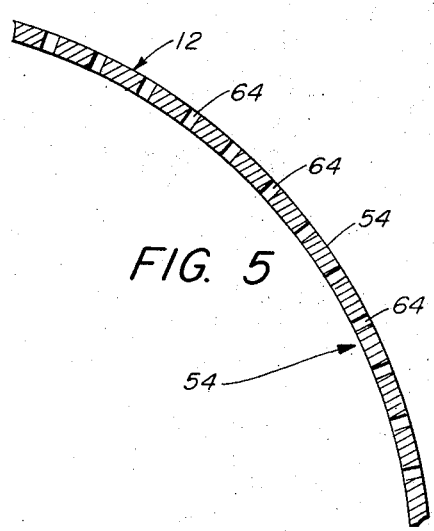
FIG. 5 is an enlarged view of a portion of FIG. 4 encircled in line 5—5.

FIGS. 4, 5 and 6 illustrate the unique properties of air flow that are afforded by the air filtration device shown in FIGS. 1-3, inclusive. Arrows 60 in FIG. 4 show that air ingested through the intake port 22 is moved upward in the cabinet through the HEPA filter 36, out through the foraminous plate 12. an array of short straight lines 62 radiating from the plate indicates in a general way the configuration of the flow of filtered air from the device. As FIG. 5 illustrates, the plate 12 is perforated with an array of straight holes 64 that are all perpendicular to the plate. The holes are thereby oriented so that each directs air passing through it in a direction that is normal to the plate. Thus the holes in the lower portion 50 of the plate direct exhaust air in a generally downward direction, relative to the vertical front wall 14, while the holes in the bulge 54 direct exhaust air in an expanding flow pattern as it moves away from the front wall of the cabinet. The air flow from the upper portion 56 of the bulge 54, adjacent the upper horizontal edge of the plate 12, is compressed, or squeezed together by the overhanging forward portion 46 of the top wall 44, thereby increasing its exhaust velocity relative to exhaust air from the lower portion of the plate 12.

In a practical filtration device that has been built, the plate 12 is metal, 0.058 inch thick, and the holes 64 are 0.050 inch in diameter, with centers 0.30 inch apart. Photographically recorded tests of the device in operation with cigarette smoke emitted by a cigarette held close to the top wall 44 revealed a pattern like that illustrated in FIG. 6. The smoke passing over the top formed a cloud 70 as it moved forward of the front edge 48 and moved upward away from the filtred air stream intended for use by the user of the device. Similar action applies to other unfiltered matter, such as dust, from the top wall 44. It is thus a feature of the invention that unfiltered matter that might enter the filtered air stream is diverted away from the filtered air intended for breathing by a user of the device.

A second example of the filtration device shown in FIGS. 7 and 8 is generally similar to the device of FIGS. 1–3, and parts that are similar have the same reference characters in both examples. In FIG. 7, the intake port 78 is in the bottom wall of the cabinet, and casters 76 are fitted to the cabinet to facilitate moving it. The cabinet is high enough to function as a headboard for a bed 80, which is coupled to the front wall 14 with connecting fittings 82. The plate 12 is elevated above the top of the bed, so that filtered air from the lower portion 50 is directed generally downward across the top of the bed, from one end to the other, as is illustrated by the flow arrows 84. Some of the air flows downward over the remote end of the bed as shown by the flow arrow 90, and under the bed into the intake port 78 as is shown by the flow arrow 92. This contributes to cleaning the air in a room in which the bed is located. Filtered air issuing through the bulge 54 moves upward and away from the bed, carrying away from a person in the bed any unfiltered particles that may enter the filtered air stream from the top wall 44. The filtration unit is here described as a headboard, and thus is fitted to the head end of the bed, but could be fitted to the foot end if desired. The general combination of an air filtration device and a bed, without the present invention, is shown and described in a commonly assigned application Ser. No. 330,196 filed Feb. 2, 1973 by the present inventor and another. Reference is made to that application for a description of HEPA filters that are suitable for use in the present invention.

We claim:

1. An air filtration device for supplying filtered air to one or more individual persons adapted to be positioned adjacent to and above said persons comprising a cabinet having an air intake port and an air outlet port, said outlet port being located in a normally vertically oriented front wall of said cabinet, filter means in said cabinet, means to force air through said cabinet from said intake port to said outlet port through said filter means, a foraminous plate fully covering said outlet port, said plate being generally flat and downwardly inclined in its lower portion and curved about a horizontal axis in its upper portion to provide a horizontally-oriented bulge away from said front wall and towards the front of the cabinet in its upper portion, and said cabinet including hood means which have side walls embracing the side edges of said plate and a top wall overlying and connected to said bulge, said plate having a plurality of passages through it each of said passages being essentially perpendicular to said plate thereby passing air through it in a direction normal to said plate, whereby the outlet flow of air from said device will expand in the vicinity of said bulge and thereby be prevented from contracting, and the upper portion of said flow will have on upward-motion component so as to devert away from the region in front of said outlet port unfiltered matter that may enter the exhaust air stream from the top of said cabinet.

2. An air filtration device according to claim 1 in combination with a bed, said device being located at one end of the bed and said outlet port being oriented to exhaust air over the top of said bed from said one end to the other end of the bed, whereby exhaust air from the lower portion of said plate will sweep downward over the top of the bed.

3. An air filtration device, in a combination according to claim 2 having its intake port located adjacent the underside of the bed for ingesting air sweeping down over said bed and around said other end thereof.

4. An air filtration device in a combination according to claim 2 in which said device is incorporated in a headboard attached to said bed, said cabinet being fitted with means for attaching it to said bed.

5. An air filtration device acording to claim 1 in which the part of said plate in the upper part of said bulge adjacent its top boundary makes an acute angle with the overlying part of said top wall such that exhaust air from the passages through said part is squeezed against said overlying part of the top wall so as to increase the velocity of the exhaust air stream in the immediate vicinity of said overlying part, thereby to enhance the diversion of said unfiltered matter away from the region in front of the outlet port.

6. An air filtration device according to claim 5 in which the forward-most increment of said plate and the forward-most edge of said top wall lie approximately in the same vertical plane.

7. An air filtration device according to claim 1 in which said intake port is horizontally oriented in a bottom wall of said cabinet, and said filter means is vertically oriented confronting the air outlet port, air moving means being supported in the lower portion of said cabinet.

* * * * *